United States Patent
Ren et al.

[11] Patent Number: 6,160,814
[45] Date of Patent: Dec. 12, 2000

[54] DISTRIBUTED SHARED-MEMORY PACKET SWITCH

[75] Inventors: Jing-Fei Ren, Plano, Tex.; Randall J. Landry, Merrimack, N.H.; Martin J. Izzard, Dallas, Tex.

[73] Assignee: Texas Instruments Incorporated, Dallas, Tex.

[21] Appl. No.: 09/085,993

[22] Filed: May 27, 1998

Related U.S. Application Data

[60] Provisional application No. 60/048,193, May 31, 1997.

[51] Int. Cl.$^7$ ..................................................... H04L 12/54
[52] U.S. Cl. ............................................ 370/427; 370/429
[58] Field of Search .................................... 370/395, 398, 370/399, 492, 493, 494, 495, 496, 417, 418, 419, 422, 423, 427, 428, 429, 532, 535, 536, 537, 538, 542, 543, 544

[56] References Cited

U.S. PATENT DOCUMENTS

| | | | |
|---|---|---|---|
| 5,123,012 | 6/1992 | Suzuki et al. | 370/379 |
| 5,347,513 | 9/1994 | Abefelt et al. | 370/381 |
| 5,687,324 | 11/1997 | Greene et al. | 370/414 |
| 5,796,966 | 8/1998 | Simcoe et al. | 710/131 |

OTHER PUBLICATIONS

Wei, et al., "Decentalized Control of a Multiple Shared Memory Module ATM Switch", IEEE, Supercomm/International Conference on Communications '92, pp. 704–708.

Wei, et al., "On the Mulitple Shared Memory Module Approach to ATM Switching", IEEE Infocom '92 The Conference on Computer Communications, vol. 1 of 3, '92, pp. 116–123.

Kondoh, et al., A Shared Multibuffer Architecture for High–Speed ATM Switch LSIs, IEICE Trans Electron., vol E76–C, No. 7, Jul. 1993, pp. 1094–1101.

*Primary Examiner*—Chi H. Pham
*Assistant Examiner*—Kwang B. Yao
*Attorney, Agent, or Firm*—Tammy L. Williams; Wade James Brady, III; Frederick J. Telecky, Jr.

[57] ABSTRACT

A packet switch (26) has N digital input ports (28) each of bandwidth B for receiving data cells including destination addresses for determining output ports, a shared input cache (32), N memory modules (36) of bandwidth N×B for buffering, a switch fabric (38), and N digital output ports (40). A digital multiplexer (30) receives each data cell from the input ports (28) and writes it to the shared input cache (32) together with a corresponding port queue number, queue position, and memory module number in response to its destination address so that (1) cells having the same queue number are cyclically assigned to different memory modules (36) and (2) cells having the same queue position are cyclically assigned to different memory modules (36). A digital demultiplexer (34) reads each data cell from the shared input cache (32) and writes it to one of the N memory modules (36) according to its assigned memory module number and queue position. Then the switch fabric (38) reads the data cells in each memory module (36) by queue position and writes each to a corresponding output port (40) matching the cell's queue number.

2 Claims, 3 Drawing Sheets

DISTRIBUTED SHARED-MEMORY PACKET SWITCH

This application claims priority under 35 U.S.C. §119(e)(1) of provisional application Ser. No. 60/048,193 filed May 31, 1997, the entirety of which is incorporated herein by reference.

FIELD OF INVENTION

Our invention relates to packet switching, and more particularly to architectures for, and methods of using, multiport packet switches, particularly at high speeds such as gigabits/second with good delay-throughput.

BACKGROUND OF THE INVENTION

Conventional shared-memory packet switch architecture makes best use of memory capacity while achieving the optimal delay-throughput properties. However, for N ports, the shared-memory's bandwidth has to be N times each individual port's bandwidth B. For a multiport gigabit packet switch, this requires using expensive fast SRAM and wide memory interfaces for a multiport gigabit packet switch.

Researchers have been working on building fast switches out of memory modules operating at port speeds. For example, an input-queuing switch architecture uses N memory modules of bandwidth B, one for each port. But the basic input-queuing architecture suffers from head-of-line blocking and only achieves about 63% throughput. Although sophisticated scheduling algorithms have been proposed to improve the performance of the input-queuing switches, they have yet to achieve the ideal delay-throughput properties and efficient memory capacity utilization of shared-memory architecture.

Another approach is a shared-multiple-memory module (SMMM) architecture independently proposed by (1) H. Kondoh, H. Notani, and H. Yamanaka of Mitsubishi Electric Corp. in *A Shared Multibuffer Architecture for High-Speed ATM Switch LSIs,* IEICE Trans. Electron. Vol.E76-C, No.7, July 1993, pp.1094–1101, and S. Wei and V. Kumar of AT&T Bell Labs in (2) *On the Multiple Shared Memory Module Approach to ATM Switching,* Proceedings of IEEE ICC 1992, pp. 116–23 and (3) *Decentralized Control of a Multiple Shared Memory Module ATM Switch,* Proceedings of IEEE ICC 1992, pp.704–708, 1992, each of which articles is hereby incorporated by reference.

For SMMM the N input ports are connected to M memory modules which are in turn connected to the N output ports, conceptually through two switch fabrics. Although Bell Labs' switch architecture using either a centralized scheduling scheme in (2) or a decentralized scheduling scheme in (3) can provide an ideal delay-throughput, it requires 2N−1 memory modules, each having a bandwidth B. The Mitsubishi Electric switch requires N memory modules of bandwidth 2B to achieve a reasonable throughput. And while memory architecture has been extensively studied in the context of the multiple processing, because packet switching has a different ordering, that earlier architecture cannot be used for a switch design.

Although for many years memory cell capacity has been increasing exponentially, memory bandwidth has only been increasing linearly. So one object of our invention is to build an N-port switch that only requires N memory modules of bandwidth B, as an input-queuing switch does. This would make it possible to build the fastest switch with a given memory technology or build switches with inexpensive RAMs. Other objects of our invention are to achieve optimal delay-throughput to meet performance requirements and to allow maximum sharing of memory space to enable the switch product to be competitively priced.

SUMMARY OF THE INVENTION

Our packet switch has a novel distributed shared-memory architecture providing N digital input ports of bandwidth B for receiving data cells including destination addresses for determining output ports, a shared input cache, N memory modules of bandwidth N·B for buffering, a switch fabric, and N digital output ports. A digital multiplexer 30 receives each data cell from the input ports and writes it to the shared input cache together with a corresponding port queue number, queue position, instead memory module number in response to its destination address so that (1) cells having the same queue number are cyclically assigned to different memory modules and (2) cells having the same queue position are cyclically assigned to different memory modules. Next a digital demultiplexer 34 reads each data cell from the shared input cache and writes it to one of the N memory modules according to its assigned memory module number and queue position. Then the switch fabric reads the data cells in each memory module by queue position and writes each to a corresponding output port matching the cell's queue number.

Our invention also includes a new method of operating a packet switch having N digital input ports of bandwidth B for receiving data cells including destination addresses for determining output ports, a shared input cache, N memory modules of bandwidth N·B for buffering, a switch fabric, and N digital output ports. In our method, first each data cell received by the ports is written to the shared input cache together with a corresponding port queue number, queue position, instead memory module number in response to its destination address so that (1) cells having the same queue number are cyclically assigned to different memory modules and (2) cells having the same queue position are cyclically assigned to different memory modules. Next each data cell is read from the shared input cache and written to one of the N memory modules according to its assigned memory module number and queue position. Then the data cells in each memory module are read by queue position and each written to a corresponding output port matching the cell's queue number.

Our distributed shared-memory architecture uses only a small input cache and N memory modules of bandwidth B to implement an N-port packet switch, its aggregate memory bandwidth is only N·B. While the architecture has the same memory bandwidth requirement as the input-queuing, it achieves virtually the ideal delay-throughput performance and maximum memory capacity utilization as the shared-memory switch. We believe this architecture is particularly suitable to a low cost multiple port gigabit switches using commercial DRAM modules. These and further advantages of our invention will become more apparent by way of example in the detailed description below.

DETAILED DESCRIPTION

Figure 1:
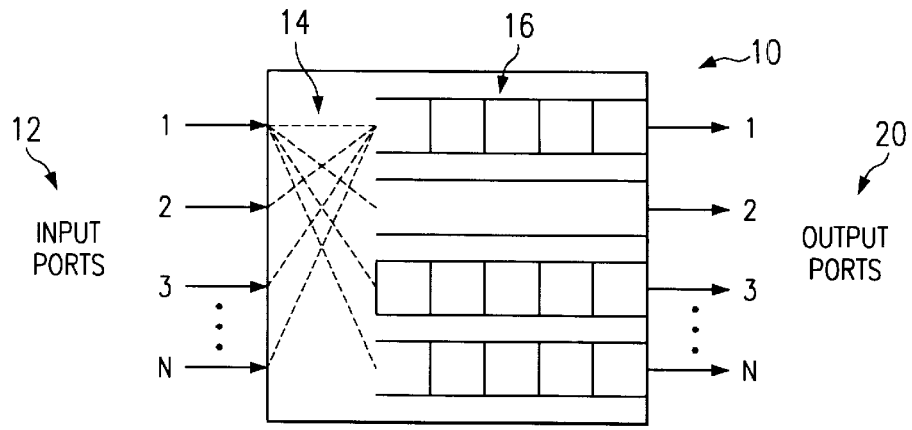
FIG. 1 is a general sketch of a packet switch 10 for switching 14 data cells arriving at N input ports 12 into cells 16 directed to N output ports 20.
Figure 2:
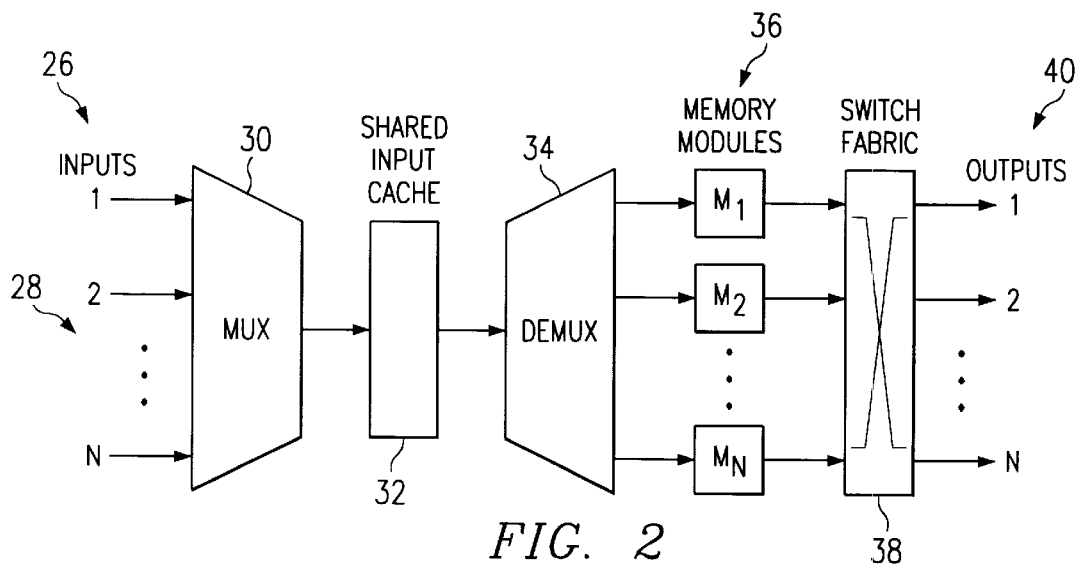
FIG. 2 is a block diagram of an embodiment of a distributed shared-memory switch according to our invention.

An embodiment of our distributed shared-memory switch 26 is shown in FIG. 2. Switch 26 has N input ports 28 coupled by a digital multiplexer (MUX) 30 to a shared input cache 32, a digital demultiplexer (DEMUX) 34, N memory modules 36 and a switch fabric 38 coupling memory modules 36 to N output ports 40. We will use the generic term "cell" to refer to a data segment of fixed length handled by the switch. The transmission time of a cell at the port speed is measured in slot time. Since the memory modules operate at the same speed (or bandwidth) as the ports, at most one cell may be written into and at most may be read from a memory module per slot time.

Figure 3:
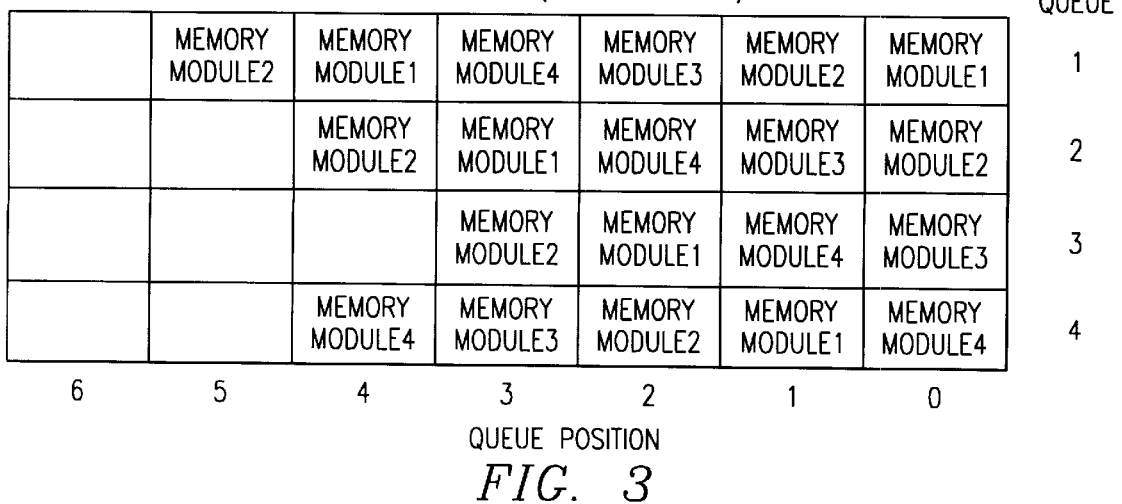
FIG. 3 illustrates how N logical queues, one for each output port, are two-dimensionally distributed in the memory modules of FIG. 2.

While there are numerous ways to assign arriving cells to the N memory modules, we use a two-dimensional cyclic order paradigm from the output logical queues' perspective, as illustrated by FIG. 3 for a 4-port switch. Each output port 40 has a corresponding logical queue. Cells in the same logical queue are buffered to resolve output conflicts and then sent out to an corresponding output port 40, one per slot time. Cells in the same logic output queue are placed in different memory modules 36 in a cyclic fashion. furthermore, cells belonging to different logic queues but the same queue position are placed in different memory modules 36 in cyclic order.

Because only one cell may be written into a memory module 36 in one slot time, it is not always possible to place all arriving cells in the memory modules 36 in the two-dimensional cyclic order. Therefore, if more than one arriving cell is assigned to the same module to meet the cyclic order requirement, all the cells but one are temporarily buffered in shared input cache 32. To enable sharing of cache 32, multiplexer 30 and demultiplexer 34 are used. When up to N cells arrive at the beginning of a slot,multiplexer 30 assigns each its own memory module 36 numbers following the two-dimensional cyclic order and sends them to shared input cache 32. The input cache 32 is organized as N queues, one for each memory module 36. At each slot time, demultiplexer 34 routes the first cell (if any) in each queue to a specified memory module 36. The newly arriving cells join the tails of the queues according to their module number. We can show that if the cache memory 32 is completely shared by all N queues and cells are assigned module numbers based on their arrival order, by following the two-dimensional cyclic distribution there are at most $$\sum_{i=1}^{N-1} i = \frac{N(N-1)}{2}$$

cells in the cache 32. For example, for a switch of 16 ports, a cache of only 120 cells is sufficient. If each cell is 72 bytes in length, this cache requires less than 70 Kbits.

The N memory modules 36 provide the large buffer space required for the fast packet switch. Since a double cyclic order is followed when placing cells into memory modules 36, at any slot time the switch fabric 38 can read out the cell at the head of each logic queue from the memory 36 and route it to its appropriate port 40. The simplicity and regularity of the two-dimensional cyclic order facilitates scheduling cell transmissions over the fabric 38.

SIMULATION

Figure 4:
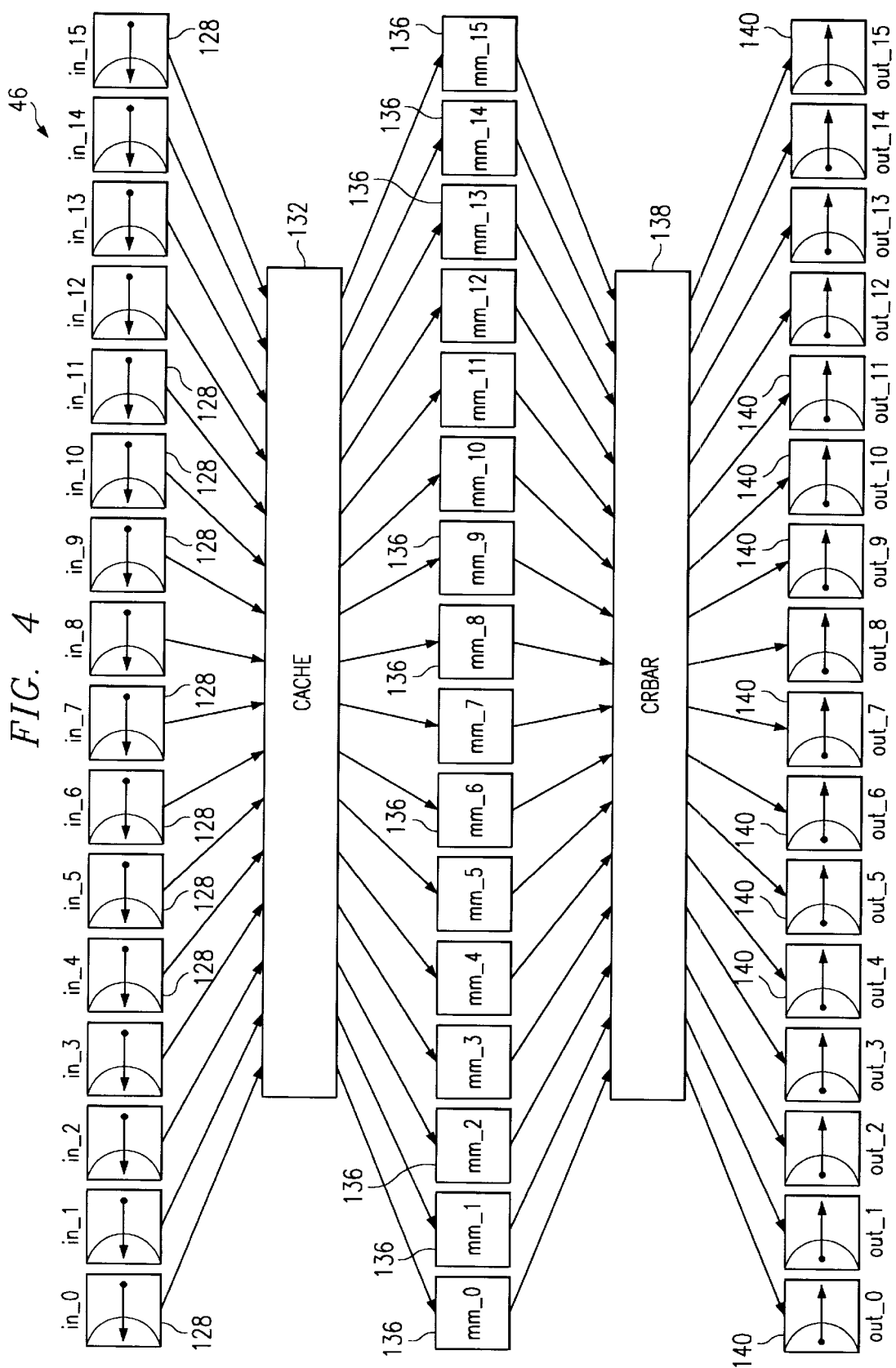
FIG. 4 is a block diagram of an event-driven simulation model at the node level of a 16 port distributed shared-memory switch using an Opnet modeler to study performance of the switch architecture.

To study our switch's performance, we used an Opnet modeler to build a event-driven simulation model 46 of a 16 port distributed shared-memory switch. FIG. 4 shows switch model 46 at Opnet's node level. The input 128 and output 140 ports are respectively denoted by in_i and out_i (i=0, 1, . . . , 15). The functions of multiplexer 30 and demultiplexer 34 were modeled by using a mechanism in the cache module 132 that handles multiple data streams. Cache module 132 also modeled other functions required by the shared input cache 32, including queuing cells according to the memory module numbers and memory sharing among all the queues. The memory modules instead 36 were modeled by the (N=16) mm_i modules in the model 46. Finally, the switch fabric 38 was modeled by the module called crossbar (CRBAR) 138. To meet the bandwidth constraint, each link was only allowed to transmit one cell during a slot time. Similarly, each memory module 36 could only receive and transmit atmostone cell during a slot time.

To assess switch performance, a cell generator not shown was connected to each input port 128. One cell was generated per slot time, providing a 100% traffic load. The cell's destination was uniformly chosen from the other N−1 ports. Therefore, the traffic was symmetric. The destination ports of successive cells from the same cell generator were correlated to create burstiness from the output ports' 140 perspective. The burstiness was adjustable by a correlation parameter. Each output port 140 was connected to a traffic sink not shown where its received cells were destroyed.

Figure 5A:
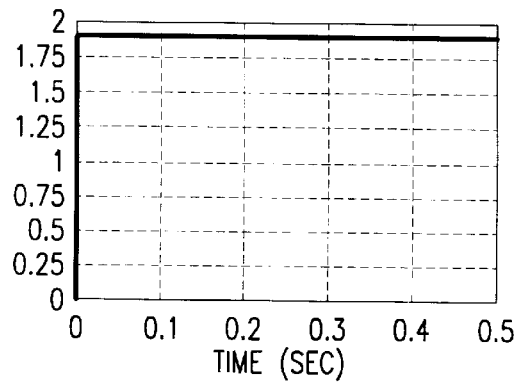
FIG. 5A shows the cell input rate (cells/sec) measured at input port in_0, FIG. 5B the output rate measured at output port out_0, FIG. 5C the total number of cells in the input cache, and FIG. 5D the number of cells in memory module mm_0 in the simulation of FIG. 4, for the simulation model of FIG. 4.
Figure 5B:
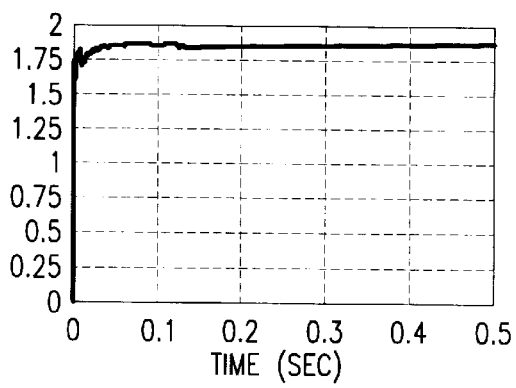

FIGS. 5A–5D show some results for a 0.5 second simulation run. FIG. 5A shows the cell input rate (cells/sec) measured at input port in_0. All the other 15 ports (in 1 through 15) should have the same input rate. FIG. 5B shows the output rate measured at output port out_0. The output rate converges to the input rate, indicating that a 100% throughput is achieved (the dispersion between input and output rates is mostly due to output port conflict inherent in all packet switches with burst traffic).

Figure 5C:
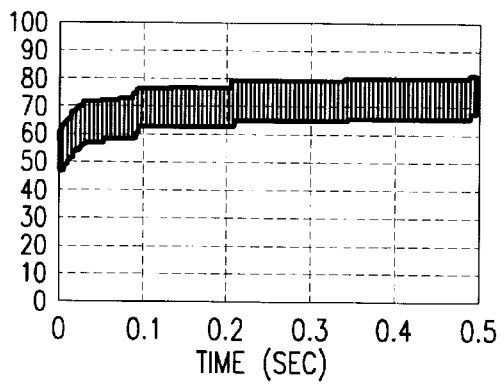

FIG. 5C shows the total number of cells in the input cache 132. There is a range for the number of cells for a given time because the measurement is taken after arrival and departure of cells at the input cache 132. The lowest value is the number of cells after departure and the highest value is the number of cells after arrival. As expected, under 100% traffic load, the number of cells in the input cache 132 increases monotonically, but it is well below the given bound of 120 cells even after 0.5 second.

Figure 5D:
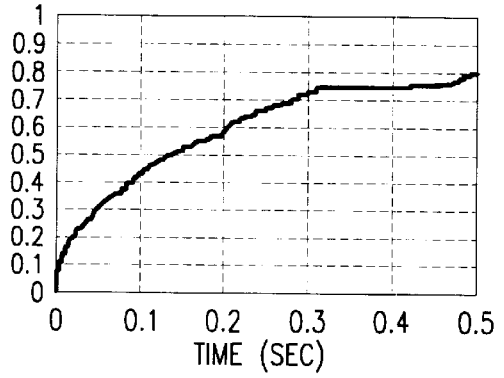

Finally, FIG. 5D shows the number of cells in memory module mm_0. Again, we see it increases monotonically. Queues are built up here due to output conflict.

Although the detailed embodiment and simulation described in this disclosure are for memory modules with the port bandwidth, our distributed shared-memory switch architecture can be easily extended to the case where memory modules are faster than port speed. For instance, a switch of N ports may be built out of N/2 modules of speed 2B.

What is claimed is:

1. A packet switch comprising:

N digital input ports, each of bandwidth B, for receiving a corresponding arriving stream of input data cells, each data cell including a destination address from which an output port can be determined;

a shared input cache for storing the data cells received by the input ports;

a digital multiplexer for receiving each data cell from the input ports and writing it to the shared input cache together with a corresponding port queue number, queue position, and memory module number in response to its destination address so that (1) cells having the same queue number are cyclically assigned to different memory modules and (2) cells having the same queue position are cyclically assigned to different memory modules;

N memory modules, each of bandwidth B for buffering a stream of data cells;

a digital demultiplexer for reading each data cell from the shared input cache and writing it to one of the N memory modules according to its assigned memory module number and queue position;

N digital output ports, each of bandwidth B; and a switch fabric for reading the data cells in each memory module by queue position and writing each to a corresponding one of said N digital output ports matching the cell's queue number.

2. A method of operating a packet switch having N digital input ports of bandwidth B for receiving data cells including destination addresses for determining output ports, a shared input cache, N memory modules of each of bandwidth B for buffering, a switch fabric, and N digital output ports, comprising the steps of:

writing each data cell received by input the ports to the shared input cache together with a corresponding port queue number, queue position, and memory module number in response to its destination address so that (1) cells having the same queue number are cyclically assigned to different memory modules and (2) cells having the same queue position are cyclically assigned to different memory modules;

reading each data cell from the shared input cache and writing it to one of the N memory modules according to its assigned memory module number and queue position; and reading the data cells in each memory module by queue position and writing each to a corresponding output port matching the cell's queue number.

* * * * *